US012568460B2

(12) United States Patent
Meng et al.

(10) Patent No.: US 12,568,460 B2
(45) Date of Patent: Mar. 3, 2026

(54) POSITIONING

(71) Applicant: Nokia Technologies Oy, Espoo (FI)

(72) Inventors: Yan Meng, Shanghai (CN); Jianguo Liu, Shanghai (CN); Tao Tao, Shanghai (CN); Diomidis Michalopoulos, Munich (DE); Ryan Keating, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 330 days.

(21) Appl. No.: 18/556,041

(22) PCT Filed: Jul. 12, 2021

(86) PCT No.: PCT/CN2021/105836

§ 371 (c)(1),
(2) Date: Oct. 18, 2023

(87) PCT Pub. No.: WO2023/283783

PCT Pub. Date: Jan. 19, 2023

(65) Prior Publication Data

US 2024/0205871 A1      Jun. 20, 2024

(51) Int. Cl.
*H04W 64/00* (2009.01)
*H04L 5/00* (2006.01)
*H04W 24/10* (2009.01)

(52) U.S. Cl.
CPC ........... *H04W 64/00* (2013.01); *H04L 5/0048* (2013.01); *H04W 24/10* (2013.01)

(58) Field of Classification Search
CPC . H04W 64/00; H04W 64/003; H04W 64/006;

H04W 24/10; H04L 5/0048; G01S 5/0036; G01S 5/02; G01S 5/10; G01S 5/0244; G01S 5/0236
See application file for complete search history.

(56) References Cited

U.S. PATENT DOCUMENTS

| 11,006,384 B2 | 5/2021 | Kumar et al. | |
|---|---|---|---|
| 11,588,538 B2 * | 2/2023 | Chen | H04B 7/063 |
| 12,019,174 B2 * | 6/2024 | Si | H04W 24/10 |

(Continued)

FOREIGN PATENT DOCUMENTS

| CN | 111565414 A | 8/2020 |
|---|---|---|
| WO | 2020/168253 A1 | 8/2020 |

(Continued)

OTHER PUBLICATIONS

"3rd Generation Partnership Project; Technical Specification Group Radio Access Network; LTE Positioning Protocol (LPP) (Release 16)", 3GPP TS 37.355, V16.4.0, Mar. 2021, pp. 1-298.

(Continued)

*Primary Examiner* — Siu M Lee
(74) *Attorney, Agent, or Firm* — Nokia Technologies Oy

(57) ABSTRACT

Embodiments of the present disclosure relate to positioning. A first device performs positioning measurements of a first set of reference signals in a first frequency range. If the first device determines that quality of service requirements for positioning the first device are satisfied, the first device transmits a first measurement report to a second device. The first measurement report only comprises a first set of measurement results associated with the first set of reference signals.

15 Claims, 6 Drawing Sheets

410

PERFORM POSITIONING MEASUREMENTS OF A FIRST SET OF REFERENCE SIGNALS IN A FIRST FREQUENCY RANGE

420

IN ACCORDANCE WITH A DETERMINATION THAT QUALITY OF SERVICE REQUIREMENTS FOR POSITIONING THE FIRST DEVICE ARE SATISFIED, TRANSMIT A FIRST MEASUREMENT REPORT TO A SECOND DEVICE, THE FIRST MEASUREMENT REPORT ONLY COMPRISING A FIRST SET OF MEASUREMENT RESULTS ASSOCIATED WITH THE FIRST SET OF REFERENCE SIGNALS

(56) References Cited

U.S. PATENT DOCUMENTS

| | | | | | |
|---|---|---|---|---|---|
| 12,206,607 | B2 * | 1/2025 | Akkarakaran | .......... | G01S 1/042 |
| 12,248,087 | B2 * | 3/2025 | Yoon | ......................... | G01S 5/12 |
| 12,326,507 | B2 * | 6/2025 | Fischer | ................. | H04L 5/0091 |
| 2015/0289141 | A1 | 10/2015 | Ghasemzadeh et al. | | |
| 2019/0074946 | A1 * | 3/2019 | Xue | ....................... | H04L 5/0082 |
| 2021/0067990 | A1 | 3/2021 | Opshaug et al. | | |
| 2024/0121753 | A1 * | 4/2024 | Bao | ..................... | H04W 64/006 |

FOREIGN PATENT DOCUMENTS

| | | | |
|---|---|---|---|
| WO | 2020/221042 A1 | 11/2020 | |
| WO | 2022/046359 A1 | 3/2022 | |

OTHER PUBLICATIONS

"3rd Generation Partnership Project; Technical Specification Group Radio Access Network; NG Radio Access Network (NG-RAN); Stage 2 functional specification of User Equipment (UE) positioning in NG RAN (Release 16)", 3GPP TS 38.305, V16.4.0, Mar. 2021, pp. 1-119.

"3rd Generation Partnership Project; Technical Specification Group Radio Access Network; NG-RAN; NR Positioning Protocol A (NRPPa) (Release 16)", 3GPP TS 38.455, V16.3.0, Apr. 2021, pp. 1-151.

"3rd Generation Partnership Project; Technical Specification Group Services and System Aspects; Functional stage 2 description of Location Services (LCS) (Release 16)", 3GPP TS 23.271, V16.0.0, Jul. 2020, pp. 1-188.

"On Impact of NR positioning on existing RRM requirements", 3GPP TSG-RAN WG4 Meeting #95-e, R4-2006173, Agenda item: 6.8.2.2, Qualcomm Incorporated, May 25-Jun. 5, 2020, pp. 1-9.

"3rd Generation Partnership Project; Technical Specification Group Radio Access Network; NR; Physical Layer procedures for data (Release 16)", 3GPP TS 38.214, V16.5.0, Mar. 2021, pp. 1-171.

International Search Report and Written Opinion received for corresponding Patent Cooperation Treaty Application No. PCT/CN2021/105836, dated Mar. 29, 2022. 9 pages.

Partial European Search Report received for corresponding European Patent Application No. 21949579.3, dated Feb. 20, 2025, 11 pages.

"On impact of NR positioning on existing RRM requirements", 3GPP TSG-RAN WG4 Meeting #94-e, R4-2000737, Agenda item: 8.8.2.3, Qualcomm Incorporated, Feb. 24-Mar. 6, 2020, 6 pages.

* cited by examiner

400

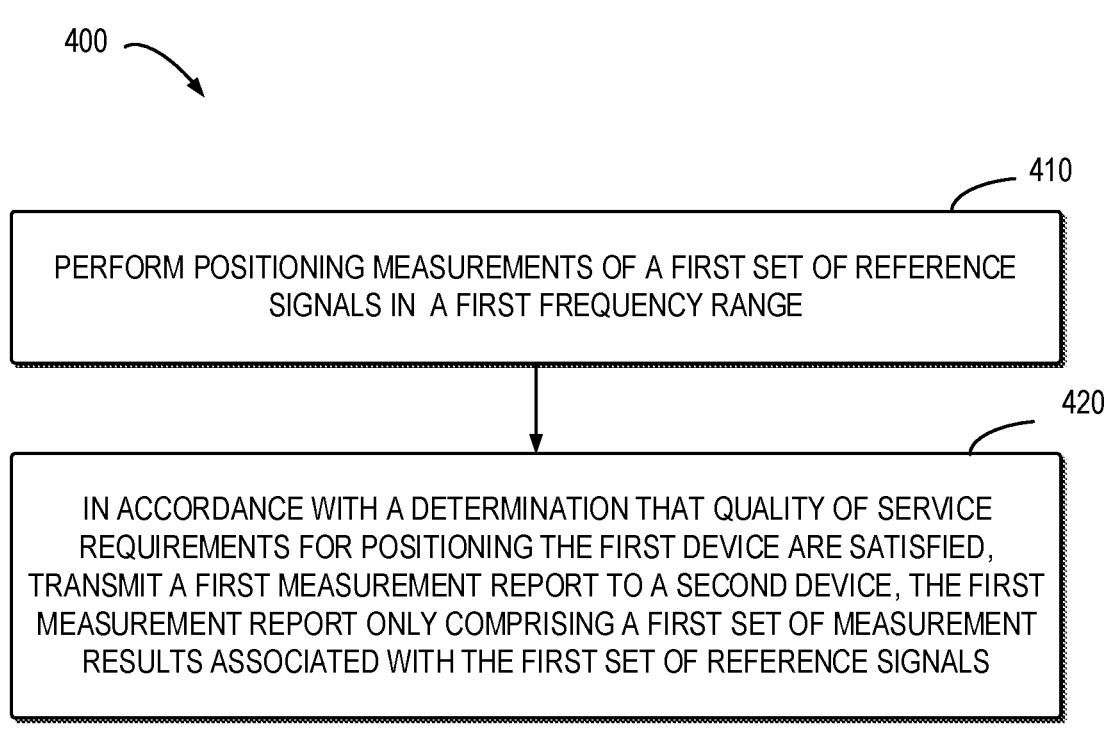

410

PERFORM POSITIONING MEASUREMENTS OF A FIRST SET OF REFERENCE SIGNALS IN A FIRST FREQUENCY RANGE

420

IN ACCORDANCE WITH A DETERMINATION THAT QUALITY OF SERVICE REQUIREMENTS FOR POSITIONING THE FIRST DEVICE ARE SATISFIED, TRANSMIT A FIRST MEASUREMENT REPORT TO A SECOND DEVICE, THE FIRST MEASUREMENT REPORT ONLY COMPRISING A FIRST SET OF MEASUREMENT RESULTS ASSOCIATED WITH THE FIRST SET OF REFERENCE SIGNALS

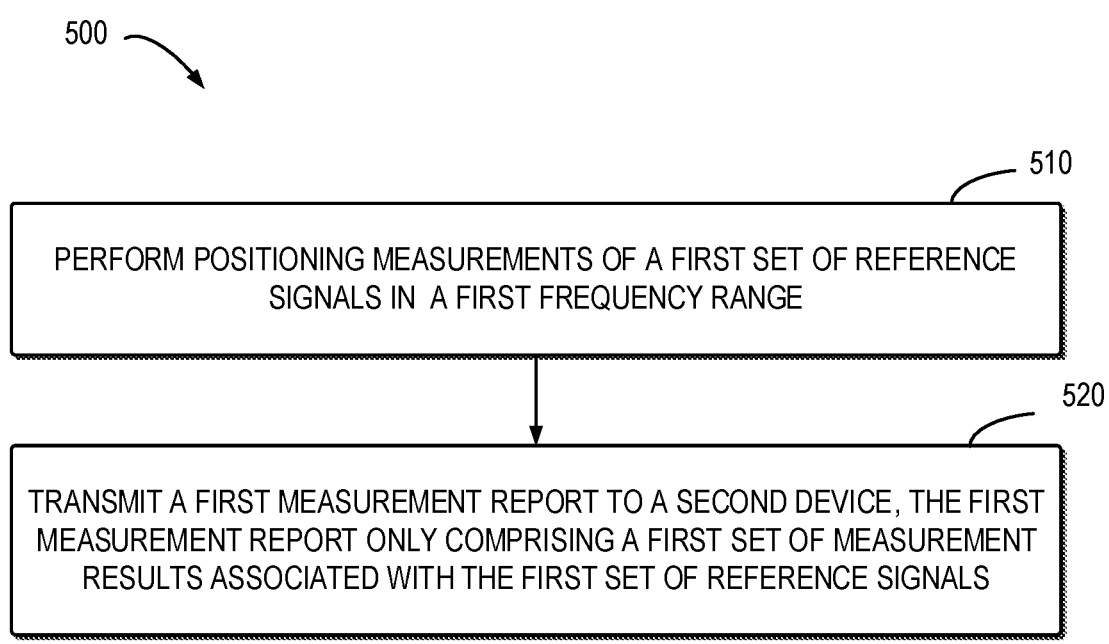

510

PERFORM POSITIONING MEASUREMENTS OF A FIRST SET OF REFERENCE SIGNALS IN A FIRST FREQUENCY RANGE

520

TRANSMIT A FIRST MEASUREMENT REPORT TO A SECOND DEVICE, THE FIRST MEASUREMENT REPORT ONLY COMPRISING A FIRST SET OF MEASUREMENT RESULTS ASSOCIATED WITH THE FIRST SET OF REFERENCE SIGNALS

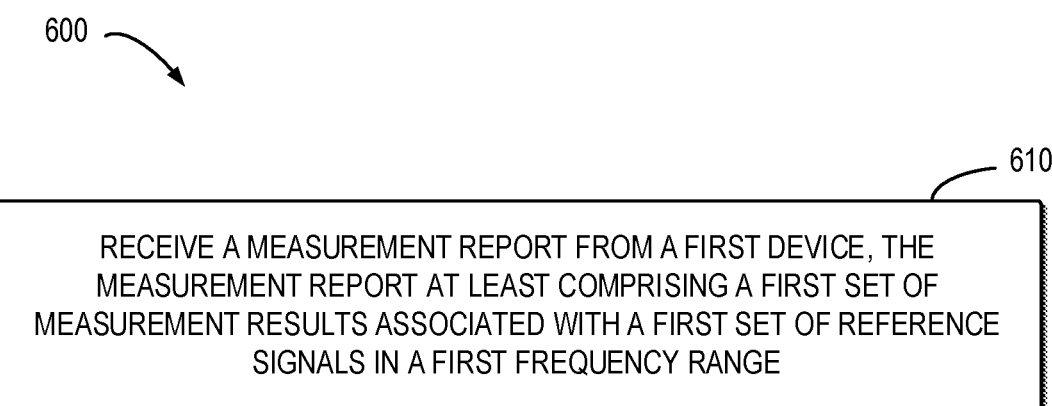

610

RECEIVE A MEASUREMENT REPORT FROM A FIRST DEVICE, THE MEASUREMENT REPORT AT LEAST COMPRISING A FIRST SET OF MEASUREMENT RESULTS ASSOCIATED WITH A FIRST SET OF REFERENCE SIGNALS IN A FIRST FREQUENCY RANGE

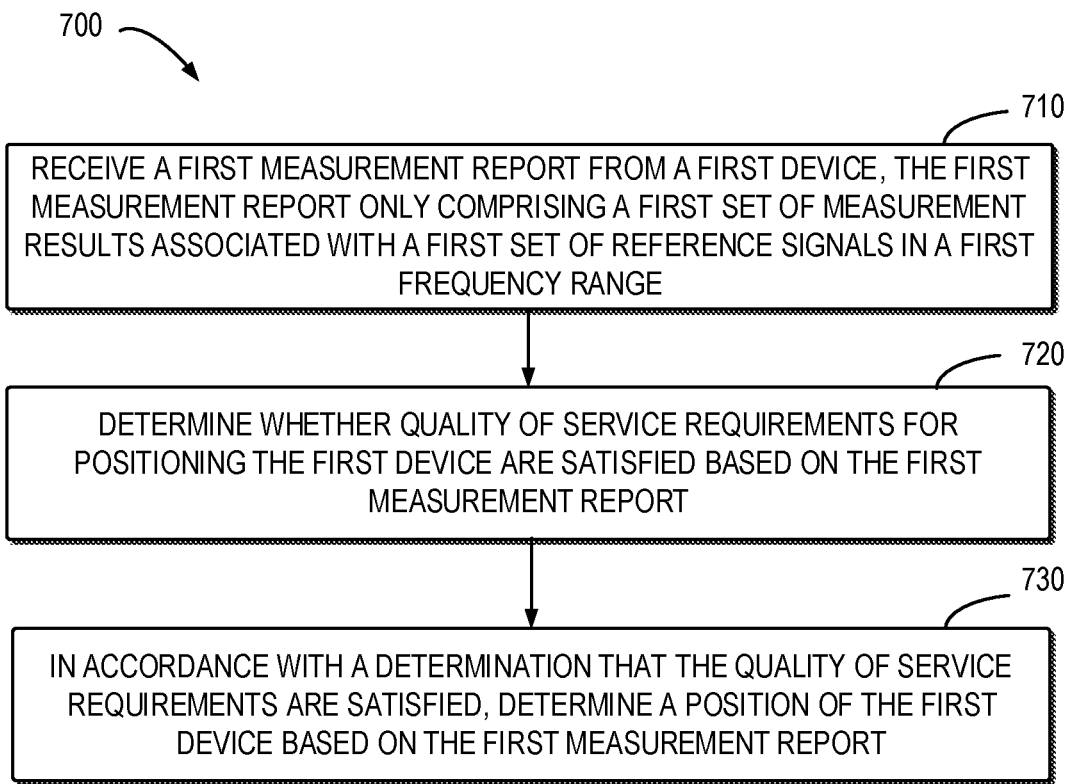

710

RECEIVE A FIRST MEASUREMENT REPORT FROM A FIRST DEVICE, THE FIRST MEASUREMENT REPORT ONLY COMPRISING A FIRST SET OF MEASUREMENT RESULTS ASSOCIATED WITH A FIRST SET OF REFERENCE SIGNALS IN A FIRST FREQUENCY RANGE

720

DETERMINE WHETHER QUALITY OF SERVICE REQUIREMENTS FOR POSITIONING THE FIRST DEVICE ARE SATISFIED BASED ON THE FIRST MEASUREMENT REPORT

730

IN ACCORDANCE WITH A DETERMINATION THAT THE QUALITY OF SERVICE REQUIREMENTS ARE SATISFIED, DETERMINE A POSITION OF THE FIRST DEVICE BASED ON THE FIRST MEASUREMENT REPORT

POSITIONING

RELATED APPLICATION

This application was originally filed as a Patent Cooperation Treaty Application No. PCT/CN2021/105836 filed on
Jul. 12, 2021, which is hereby incorporated in its entirety.

FIELD

Embodiments of the present disclosure generally relate to the field of telecommunication and in particular, to devices,
methods, apparatus and computer readable storage media for
positioning.

BACKGROUND

In Release 16, the following positioning solutions are
specified: Downlink Time Difference of Arrival (DL-
TDOA), Uplink Time Difference of Arrival (UL-TDOA),
Downlink Angle of Departure (DL-AoD), Uplink Angle of
Arrival (UL-AoA) or Multi-cell Round Trip Time (Multi-
RTT).

In Release 17, 3rd Generation Partnership Project (3GPP)
started New Radio (NR) positioning enhancement work,
focusing on increasing accuracy, reducing latency and
increasing efficiency based on solutions in Release 16. For
example, efficiency may be increased by considering low
complexity, low power consumption or low overhead.

Studying enhancements and solutions is necessary to
support the high accuracy (horizontal and vertical), low
latency, network efficiency (scalability, overhead of refer-
ence signals, etc.), and device efficiency (power consump-
tion, complexity, etc.) requirements for commercial uses
cases. The commercial uses cases may comprise general
commercial use cases and special Internet of Things (IoT)
use cases.

Most of the positioning technologies may be based on
measurements of reference signals (RS). Take DL-TDOA
technology as an example. A terminal device may receive
and measure positioning reference signal (PRS) from mul-
tiple network devices. Then, the terminal device reports
measured time of arrival (ToA) of reference signals, in the
form of Reference Signal Time Difference (RSTD), to a
location server. Finally, based on the report information
from the terminal device, the location server may use a
multi-literation algorithm to derive the positioning and
report the result to a location client.

SUMMARY

In general, example embodiments of the present disclo-
sure provide a solution for positioning.

In a first aspect, there is provided a first device. The first
device comprises: at least one processor; and at least one
memory including computer program codes. The at least one
memory and the computer program codes are configured to,
with the at least one processor, cause the first device to:
perform positioning measurements of a first set of reference
signals in a first frequency range; and in accordance with a
determination that quality of service requirements for posi-
tioning the first device are satisfied, transmit a first mea-
surement report to a second device, the first measurement
report only comprising a first set of measurement results
associated with the first set of reference signals.

In a second aspect, there is provided a first device. The
first device comprises: at least one processor; and at least one memory including computer program codes. The at least
one memory and the computer program codes are configured
to, with the at least one processor, cause the first device to:
perform positioning measurements of a first set of reference
signals in a first frequency range; and transmit a first
measurement report to a second device, the first measure-
ment report only comprising a first set of measurement
results associated with the first set of reference signals.

In a third aspect, there is provided a second device. The
second device comprises: at least one processor; and at least
one memory including computer program codes. The at least
one memory and the computer program codes are configured
to, with the at least one processor, cause the second device
to receive a measurement report from a first device, the
measurement report at least comprising a first set of mea-
surement results associated with a first set of reference
signals in a first frequency range.

In a fourth aspect, there is provided a second device. The
second device comprises: at least one processor; and at least
one memory including computer program codes. The at least
one memory and the computer program codes are configured
to, with the at least one processor, cause the second device
to: receive a first measurement report from a first device, the
first measurement report only comprising a first set of
measurement results associated with a first set of reference
signals in a first frequency range; determine whether quality
of service requirements for positioning the first device are
satisfied based on the first measurement report; and in
accordance with a determination that the quality of service
requirements are satisfied, determine a position of the first
device based on the first measurement report.

In a fifth aspect, there is provided a method. The method
comprises: performing, at a first device, positioning mea-
surements of a first set of reference signals in a first
frequency range; and in accordance with a determination
that quality of service requirements for positioning the first
device are satisfied, transmitting a first measurement report
to a second device, the first measurement report only com-
prising a first set of measurement results associated with the
first set of reference signals.

In a sixth aspect, there is provided a method. The method
comprises: performing, at a first device, positioning mea-
surements of a first set of reference signals in a first
frequency range; and transmitting a first measurement report
from the first device to a second device, the first measure-
ment report only comprising a first set of measurement
results associated with the first set of reference signals.

In a seventh aspect, there is provided a method. The
method comprises: receiving a measurement report at a
second device from a first device, the measurement report at
least comprising a first set of measurement results associated
with a first set of reference signals in a first frequency range.

In an eighth aspect, there is provided a method. The
method comprises: receiving a first measurement report at a
second device from a first device, the first measurement
report only comprising a first set of measurement results
associated with a first set of reference signals in a first
frequency range; determining whether quality of service
requirements for positioning the first device are satisfied
based on the first measurement report; and in accordance
with a determination that the quality of service requirements
are satisfied, determining a position of the first device based
on the first measurement report.

In a ninth aspect, there is provided a first apparatus. The
first apparatus comprises: means for performing positioning
measurements of a first set of reference signals in a first
frequency range; and means for transmitting a first measurement report to a second device, the first measurement report only comprising a first set of measurement results associated with the first set of reference signals in accordance with a determination that quality of service requirements for positioning the first device are satisfied.

In a tenth aspect, there is provided a first apparatus. The first apparatus comprises: means for performing positioning measurements of a first set of reference signals in a first frequency range; and means for transmitting a first measurement report from the first device to a second device, the first measurement report only comprising a first set of measurement results associated with the first set of reference signals.

In an eleventh aspect, there is provided a second apparatus. The second apparatus comprises: means for receiving a measurement report from a first device, the measurement report at least comprising a first set of measurement results associated with a first set of reference signals in a first frequency range.

In a twelfth aspect, there is provided a second apparatus. The second apparatus comprises: means for receiving a first measurement report from a first device, the first measurement report only comprising a first set of measurement results associated with a first set of reference signals in a first frequency range; means for determining whether quality of service requirements for positioning the first device are satisfied based on the first measurement report; and means for determining a position of the first device based on the first measurement report in accordance with a determination that the quality of service requirements are satisfied.

In a thirteen aspect, there is provided a non-transitory computer readable medium. The non-transitory computer readable medium comprises program instructions for causing an apparatus to perform the method according to the fifth, sixth, seventh, or eighth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 4 illustrates a flowchart of a method implemented at a first device according to some example embodiments of the present disclosure;

FIG. 5 illustrates a flowchart of a method implemented at a first device according to some example embodiments of the present disclosure;

FIG. 6 illustrates a flowchart of a method implemented at a second device according to some example embodiments of the present disclosure;

FIG. 7 illustrates a flowchart of a method implemented at a second device according to some example embodiments of the present disclosure;

Throughout the drawings, the same or similar reference numerals represent the same or similar element.

DETAILED DESCRIPTION

Figure 1:
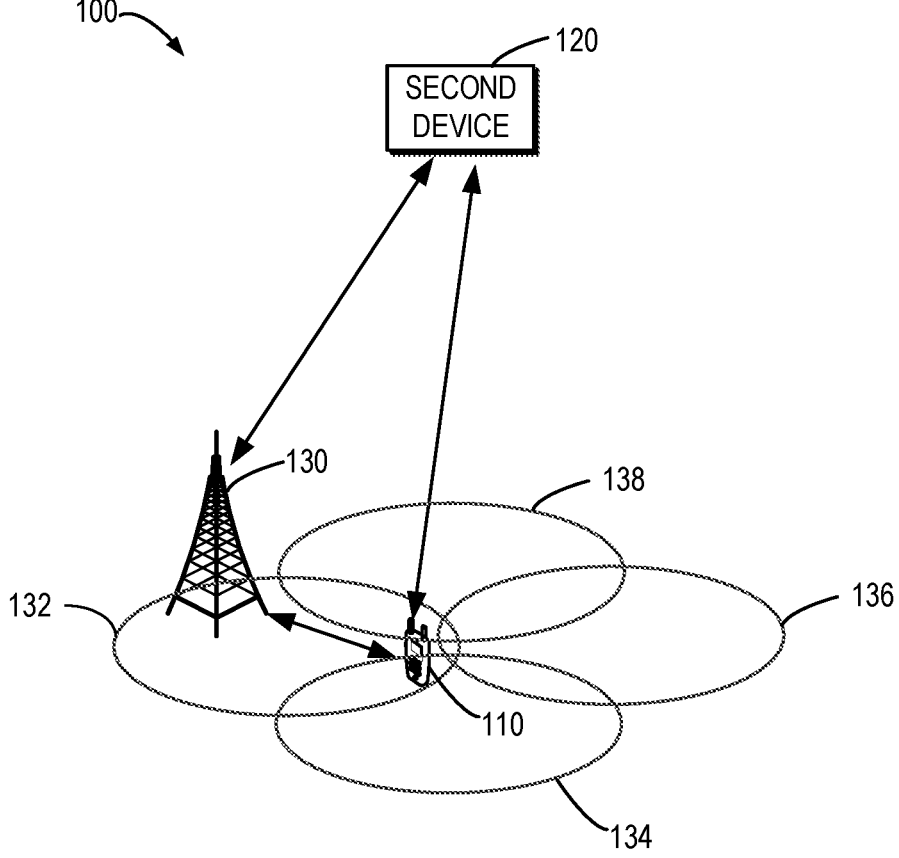
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), Integrated Access and Backhaul (IAB) node, a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehiclemounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

A terminal device may perform positioning measurements based on assistance data provided by network and the resulting measurements based on positioning reference signals (PRS) or other reference signals are used to locate the terminal device.

In NR, a new concept called Bandwidth Part (BWP) is introduced with the purpose of power saving. A terminal device is allowed to work on a narrower bandwidth than working bandwidth of a network device serving the terminal device. Although up to four downlink (DL) BWPs may be configured to the terminal device, only one DL BWP may be active at a given time. The terminal device may be configured with an active DL BWP for data reception, which is maintained and controlled by the network device serving the terminal device.

For positioning, the terminal device would receive PRS configuration related to a set of neighboring cells, which could be located in different BWPs. That means that it may happen that the BWP desired for reference signals reception is different from the active BWP of the terminal device. Thus, the terminal device may be required to measure reference signals outside the active BWP. If the terminal device is requested to provide location service, the terminal device may need to switch BWP to receive and measure reference signals outside the active BWP. After the measurement of reference signals, the terminal device also needs to switch back to the active BWP for normal data reception, which costs lots of signaling overhead and power consumption.

In addition, the terminal device will request the measurement gap (MG) if the terminal device finds the BWP of some reference signals is not aligned with the active BWP or the terminal device has limited processing capabilities. After receiving the measurement gap configuration from the network device, the terminal device would start to measure the reference signals within the measurement gap. This will result to the large latency for measurement gap request and measurement gap configuration.

In order to solve the above and other potential problems, embodiments of the present disclosure provide an improved solution for positioning. In the solution, a first device performs positioning measurements of a first set of reference signals in a first frequency range. If the first device determines that quality of service (QoS) requirements for positioning the first device are satisfied, the first device transmits a first measurement report to a second device. The first measurement report only comprises a first set of measurement results associated with the first set of reference signals. This solution may effectively decrease measurement complexity of a device for low latency and relaxed accuracy use cases.

FIG. 1 illustrates an example communication network 100 in which embodiments of the present disclosure can be implemented. As shown in FIG. 1, the communication network 100 comprises a first device 110, a second device 120 and a third device 130.

In this example, the first device 110 is illustrated as a terminal device, and the third device 130 is illustrated as a network device serving the terminal device 110. Thus, the serving area of the third device 130 is called as a cell 132. The cell 132 may be referred to as a serving cell of the first device 110.

Near the cell 132, there may be cells 134, 136 and 138 provided by other network devices (not shown). The cells 134, 136 and 138 may be referred to as neighbor cells of the first device 110.

The second device 120 may be implemented as LMF in a core network. Of course, the second device 120 may also be implemented in a radio access network (RAN), and in this case, it may be referred to as a local management component (LMC). The second device 120 may determine location information of terminal devices and provide positioning service to terminal devices and network devices. For example, the second device 120 may be requested to position the first device 110 by the AMF and then initiate a positioning procedure.

It is to be understood that the number of the first, second and third devices and the number of cells as shown in FIG. 1 are only for the purpose of illustration without suggesting any limitations. The network 100 may include any suitable number of first, second and third devices as well as cells adapted for implementing embodiments of the present disclosure.

Only for ease of discussion, the third device 130 is illustrated as a base station and the first device 110 is illustrated as a UE. It is to be understood that the base station and UE are only example implementations of the third device 130 and the first device 110, respectively, without suggesting any limitation as to the scope of the present application. Any other suitable implementations are possible as well.

The communications in the network 100 may conform to any suitable standards including, but not limited to, LTE, LTE-evolution, LTE-advanced (LTE-A), wideband code division multiple access (WCDMA), code division multiple access (CDMA) and global system for mobile communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
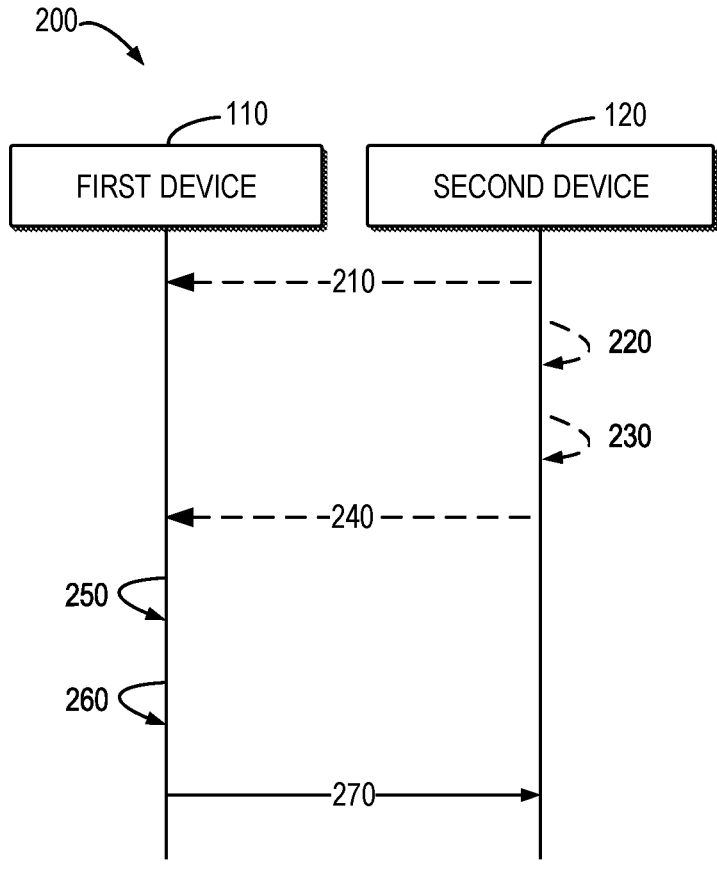
FIG. 2 illustrates a signaling chart illustrating a process for positioning according to some example embodiments of the present disclosure.

Principle and implementations of the present disclosure will be described in detail below with reference to FIGS. 2 to 7. FIG. 2 shows a signaling chart illustrating a process 200 for positioning according to some example embodiments of the present disclosure. For the purpose of discussion, the process 200 will be described with reference to FIG. 1. The process 200 may involve the first device 110 and the second device 120 as illustrated in FIG. 1. Although the process 200 has been described in the communication network 100 of FIG. 1, this process may be likewise applied to other communication scenarios.

As shown in FIG. 2, the first device 110 performs 250 positioning measurements of a first set of reference signals in a first frequency range.

In some embodiments, the first frequency range may be an active BWP of the first device 110. Alternatively, the first frequency range may comprise one or more frequencies that are identical to the frequencies of the third device 130 serving the first device 110.

In some embodiments, optionally, before performing the positioning measurements of the first set of reference signals, the first device 110 may receive 210 configuration information about an overall set of reference signals from the second device 120. The overall set of reference signals may comprise the first set of reference signals in the first frequency range and a second set of reference signals in a second frequency range (which will be described below). The second frequency range is different from the first frequency range. For example, in the embodiments where the first frequency range may be an active BWP of the first device 110, the second frequency range may be outside the active BWP of the first device 110. For another example, in the embodiments where the first frequency range may comprise one or more frequencies that are identical to the frequencies of the third device 130, the second frequency range may comprise one or more frequencies that are different from the frequencies of the third device 130.

The first set of reference signals may be transmitted from a first set of cells. For example, in the example of FIG. 1, the first set of cells may comprise the cells 132, 134 and 136. Of course, the first set of cells may comprise one or more cells which are not illustrated in FIG. 1.

The second set of reference signals may be transmitted from a second set of cells. For example, in the example of FIG. 1, the second set of cells may comprise the cell 138. Of course, the second set of cells may comprise one or more cells which are not illustrated in FIG. 1.

With continued reference to FIG. 2, the first device 110 determines 260 whether quality of service (QoS) requirements for positioning the first device 110 are satisfied.

If the QoS requirements are satisfied, the first device 110 transmits 270 a first measurement report to a second device 120. The first measurement report only comprises a first set of measurement results associated with the first set of reference signals.

On the other hand, if the QoS requirements are not satisfied, the first device 110 may further perform positioning measurements of the second set of reference signals in the second frequency range.

In some embodiments, before performing the positioning measurements of the second set of reference signals, the first device 110 may determine whether there is a measurement gap (MG). If there is no MG, the first device 110 may transmit a request for the MG to the third device 130.

Upon performing the positioning measurements, the first device 110 transmits a second measurement report to the second device 120. The second measurement report comprises the first set of measurement results associated with the first set of reference signals and a second set of measurement results associated with the second set of reference signals.

In some embodiments, the first device 110 may receive 240 from the second device 120 assistance information associated with the positioning. For example, the first device 110 may receive the assistance information in ProvideAssistanceData message in Long Term Evolution positioning protocol (LPP). For another example, the first device 110 may receive the assistance information in RequestLocationInformation message in LPP.

In turn, the first device 110 may determines whether QoS requirements for positioning the first device 110 are satisfied based on the assistance information.

In some embodiments, the second device 120 may receive a positioning request from a location service (LCS) client (not shown). The positioning request may indicate the QoS requirements for positioning the first device 110. Thus, upon receiving the positioning request, the second device 120 may determine 220 the QoS requirements from the positioning request. For example, the QoS requirements may comprise but are not limited to, location accuracy, response time, latency requirement and LCS QoS Class. In turn, the second device 120 may determine 230 the assistance information based on the QoS requirements.

Alternatively, in some other embodiments, the second device 120 may obtain the QoS requirements directly from the LCS. In this case, the action 220 in FIG. 2 may be omitted.

In some other embodiments, alternatively, the second device 120 may not determine the QoS requirements for positioning the first device 110 from the positioning request. In such embodiments, the second device 120 may determine the assistance information based on default position accuracy. For example, the second device 120 may determine the assistance information based on class of the first device 110.

In some embodiments, the assistance information may comprise a positioning measurement rule and parameters associated with the positioning measurement rule.

In some other embodiments, alternatively, the assistance information may only comprise the parameters associated with the positioning measurement rule, and the positioning measurement rule may be pre-configured.

In some embodiments, the parameters associated with the positioning measurement rule may comprise timing for the transmission of the measurement report. The timing may be determined based on latency of the transmission of the measurement report.

In a first example embodiment, alternatively or additionally, the parameters may comprise a first threshold for the number of available neighbor cells in the first set of neighbor cells transmitting the first set of reference signals, and a second threshold for reference signal received powers (RSRPs) of the first set of reference signals.

In the first example embodiment, the positioning measurement rule may be as below: if the first device 110 determines the number of the available neighbor cells is greater than the first threshold and RSRPs of reference signals from the available neighbor cells are greater than the second threshold, the first device 110 may determine that the QoS requirements are satisfied.

In the first example embodiment, the first device 110 may measure RSRPs of the first set of reference signals from the first set of neighbor cells. If RSRP of a reference signal from a neighbor cell in the first set of neighbor cells is greater than the second threshold, the neighbor cell will be taken as one of the available neighbor cells. If the number of the available neighbor cells is greater than the first threshold, the first device 110 may determine that the QoS requirements are satisfied.

In a second example embodiment, alternatively or additionally, the parameters may comprise the first threshold for the number of available neighbor cells in the first set of neighbor cells transmitting the first set of reference signals, and a third threshold for signal to noise ratios (SNRs), of time of arrival (ToA) of the first set of reference signals.

In the second example embodiment, the positioning measurement rule may be as below: if the first device 110 determines the number of the available neighbor cells is greater than the first threshold and SNRs of ToA of reference signals from the available neighbor cells are greater than the third threshold, the first device 110 may determine that the QoS requirements are satisfied.

In the second example embodiment, the first device 110 may measure SNRs of the first set of reference signals from the first set of neighbor cells. If SNR of a reference signal from a neighbor cell in the first set of neighbor cells is greater than the third threshold, the neighbor cell will be taken as one of the available neighbor cells. If the number of the available neighbor cells is greater than the first threshold, the first device 110 may determine that the QoS requirements are satisfied.

In a third example embodiment, alternatively or additionally, the first device 110 may be configured with Quasi-Colocation (QCL) sources for reference signals. In such an example embodiment, the parameters may comprise the first threshold for the number of available neighbor cells in the first set of neighbor cells transmitting the first set of reference signals, and a fourth threshold for RSRPs of Quasi-Colocation reference signals (QCL RS) from the first set of neighbor cells.

In the third example embodiment, the positioning measurement rule may be as below: if the first device 110 determines the number of the available neighbor cells is greater than the first threshold and RSRPs of the QCL RS from the available neighbour cells are greater than the fourth threshold, the first device 110 may determine that the QoS requirements are satisfied.

In a fourth example embodiment, alternatively or additionally, the positioning measurement rule may be as below: if the first device 110 determines that there is a line of sight (LoS) status in a neighbor cell, the neighbor cell may be taken as one of the available neighbor cells. If the number of the available cell is greater than the first threshold, the first device 110 may determine that the QoS requirements are satisfied.

In a fifth example embodiment, alternatively or additionally, the parameters may comprise the first threshold for the number of available neighbor cells, a sixth threshold for RSRPs of reference signals from non-LoS links of the first device 110 and a fifth threshold for the number of non-LoS links of the first device 110. The non-LoS links may be non-LoS links between the first device 110 and the third device 130.

In the fifth example embodiment, if the first device 110 determines the number of the non-LoS links in a neighbor cell is greater than the fifth threshold and RSRPs of reference signals from the non-LoS links are greater than the sixth threshold, the neighbor cell may be taken as one of the available neighbor cells. If the number of the available cell is greater than the first threshold, the first device 110 may determine that the QoS requirements are satisfied.

In the first, second, third, fourth or fifth example embodiment, the first device 110 may report RSTDs in DL-TDOA in the first measurement report. The number of the RSTDs may be equal to or greater than the first threshold.

Figure 3:
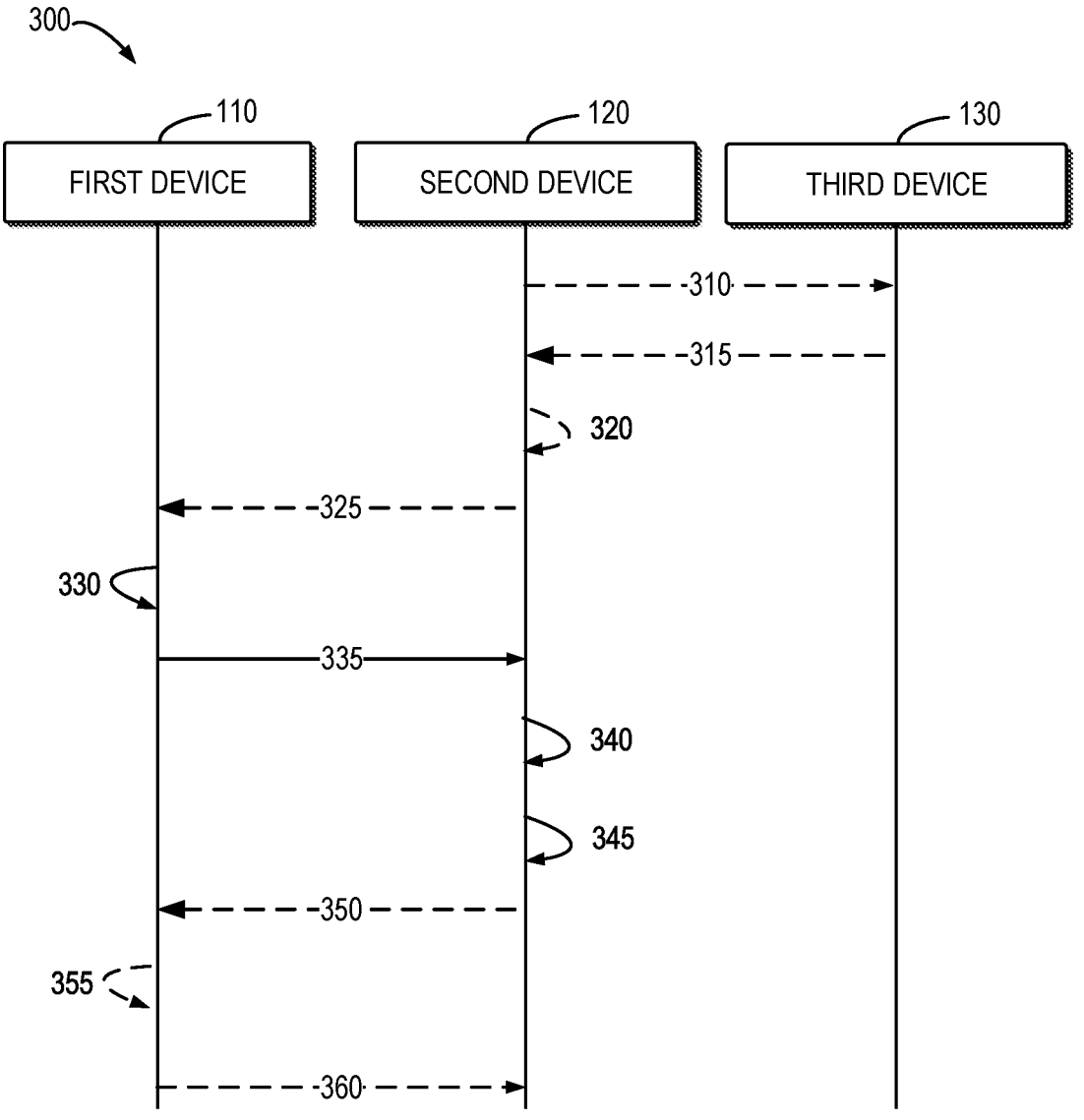
FIG. 3 illustrates a signaling chart illustrating a process for positioning according to some other example embodiments of the present disclosure.

FIG. 3 shows a signaling chart illustrating a process 300 for positioning according to some example embodiments of the present disclosure. For the purpose of discussion, the process 300 will be described with reference to FIG. 1. The process 300 may involve the first device 110, the second device 120 and the third device 130 as illustrated in FIG. 1. Although the process 300 has been described in the communication network 100 of FIG. 1, this process may be likewise applied to other communication scenarios.

As shown in FIG. 3, the first device 110 performs 330 positioning measurements of a first set of reference signals in a first frequency range.

As mentioned above, in some embodiments, the first frequency range may be the active BWP of the first device 110. Alternatively, the first frequency range may comprise one or more frequencies that are identical to the frequencies of the third device 130 serving the first device 110.

In some embodiments, similar to the process 200, before performing the positioning measurements of the first set of reference signals, the first device 110 may receive configuration information about the overall set of reference signals from the second device 120. The overall set of reference signals may comprise the first set of reference signals in the first frequency range and the second set of reference signals in the second frequency range. The second frequency range is different from the first frequency range. As mentioned above, in the embodiments where the first frequency range may be the active BWP of the first device 110, the second frequency range may be outside the active BWP of the first device 110. For another example, in the embodiments where the first frequency range may comprise one or more frequencies that are identical to the frequencies of the third device 130, the second frequency range may comprise one or more frequencies that are different from the frequencies of the third device 130.

Alternatively, in some other embodiments, instead of receiving the configuration information about the overall set of reference signals, the first device 110 may receive 325, from the second device 120, first configuration information about the first set of reference signals. For example, the first device 110 may receive the first configuration information in ProvideAssistanceData message.

In such embodiments, the second device 120 may transmit 310 a request for information about the first frequency range to the third device 130 serving the first device 110. The third device 130 may transmit 315 the information about the first frequency range to the second device 120. For example, the third device 130 may transmit the information about the first frequency range via a New Radio Positioning Protocol A (NRPPa) procedure.

Upon receiving the information, the second device 120 may determine 320 the first configuration information about the first set of reference signals based on the first frequency range. In other words, compared with the overall set of reference signals, the second device 120 determines a reduced set of reference signals which may fall in the first frequency range (such as the active BWP of the first device 110).

The first device 110 transmits 335 a first measurement report to the second device 120. The first measurement report only comprises a first set of measurement results associated with the first set of reference signals.

In some embodiments, the first device 110 may transmit, to the second device 120, an indication that the first measurement report only comprises the first set of measurement results associated with the first set of reference signals. In some embodiments, the indication may be transmitted along with the first set of measurement results. Alternatively, the indication may be transmitted separately from the first set of measurement results.

Upon receiving the first measurement result, the second device 120 determines 340 whether QoS requirements for positioning the first device 110 are satisfied based on the first measurement report.

If the QoS requirements for positioning the first device 110 are satisfied, the second device 120 determines 345 a position of the first device 110 based on the first measurement report.

Because the first device 110 only performs the positioning measurements of the first set of reference signals in the first frequency range, there is no need for the first device 110 to transmit to the third device 130 a request for the MG. Thus, latency may be reduced On the other hand, if the QoS requirements for positioning the first device 110 are not satisfied, the second device 120 transmits 350, to the first device 110, an indication that positioning measurements of the second set of reference signals are to be performed in the second frequency range.

In embodiments where the first device 110 receives the configuration information about the overall set of reference signals from the second device 120, the indication may comprise a signaling for triggering the positioning measurements of the second set of reference signals.

Alternatively, in embodiments where the first device 110 does not receive the configuration information about the overall set of reference signals from the second device 120, the indication may comprise second configuration information about the second set of reference signals. For example, the first device 110 may receive the second configuration information in ProvideAssistanceData message.

In some embodiments, the second device 120 may transmit the information of the second frequency range to the third device 130. Upon receiving the information of the second frequency range, the third device 130 may switch to the second frequency range. Correspondingly, the first device 110 may also switch to the second frequency range to receive the second set of reference signals.

The first device 110 performs 355 the positioning measurements of the second set of reference signals in the second frequency range.

In turn, the first device 110 transmits 360 a second measurement report to the second device 120. The second measurement report only comprises a second set of measurement results associated with the second set of reference signals.

Similar to the process 200, in the process 300, before performing the positioning measurements of the second set of reference signals, the first device 110 may determine whether there is an MG. If there is no MG, the first device 110 may transmit a request for the MG to the third device 130.

The processes 200 and 300 may reduce latency and complexity for some low accuracy positioning of terminal devices by avoiding BWP switch and measurement gap configuration. In addition, the processes 200 and 300 may achieve power saving for some low accuracy positioning of terminal devices by only measurement of reference signal within the first frequency range.

In the processes 200 and 300, if the first device 110 only performs positioning measurements of reference signal in the first frequency range, no request and configuration for measurement gap (MG) is needed. Thus, this type of positioning measurements may be called MG-less positioning measurements.

FIG. 4 shows a flowchart of an example method 400 implemented at a first device in accordance with some example embodiments of the present disclosure. For the purpose of discussion, the method 400 will be described from the perspective of the first device 110 with reference to FIG. 1.

At block 410, the first device 110 performs positioning measurements of a first set of reference signals in a first frequency range.

At block 420, if the first device 110 determines that quality of service requirements for positioning the first device are satisfied, the first device 110 transmits a first measurement report to a second device. The first measurement report only comprises a first set of measurement results associated with the first set of reference signals.

In some embodiments, the first device 110 receives, from the second device, assistance information associated with the positioning and determines whether the quality of service requirements is satisfied based on the assistance information.

In some embodiments the assistance information indicates at least one of the following: timing for the transmission of the first measurement report, a first threshold for the number of available neighbor cells in a first set of neighbor cells transmitting the first set of reference signals, a second threshold for RSRPs of the first set of reference signals, a third threshold for SNRs of time of arrival of the first set of reference signals, a fourth threshold for RSRPs of QCL RS from the first set of neighbor cells, or determination of an LoS status, a fifth threshold for the number of non-LoS links of the first device 110, or a sixth threshold for RSRPs of reference signals from the non-LoS links of the first device 110.

In some embodiments the first device 110 determine that the quality of service requirements are satisfied by determining at least one of the following: the number of the available neighbor cells is greater than the first threshold and RSRPs of reference signals from the available neighbor cells are greater than the second threshold, the number of the available neighbor cells is greater than the first threshold and SNRs of time of arrival of reference signals from the available neighbor cells are greater than the third threshold, the number of the available neighbor cells is greater than the first threshold and RSRPs of the QCL RS from the available neighbor cells are greater than the fourth threshold, the LoS status in each of the available neighbor cell and the number of the available neighbor cells is greater than the first threshold, or the number of the non-LoS links of the first device is greater than the fifth threshold and RSRPs of reference signals from the non-LoS links are greater than the sixth threshold in each of the available neighbor cell, and the number of the available neighbor cells is greater than the first threshold.

In some embodiments, the method 400 further comprising: in accordance with a determination that the quality of service requirements fail to be satisfied, performing positioning measurements of a second set of reference signals in a second frequency range, the second frequency range being different from the first frequency range; and transmitting a second measurement report to the second device, the second measurement report comprising the first set of measurement results associated with the first set of reference signals and a second set of measurement results associated with the second set of reference signals.

FIG. 5 shows a flowchart of an example method 500 implemented at a first device in accordance with some example embodiments of the present disclosure. For the purpose of discussion, the method 500 will be described from the perspective of the first device 110 with reference to FIG. 1.

At block 510, the first device 110 performs positioning measurements of a first set of reference signals in a first frequency range.

At block 520, the first device 110 transmits a first measurement report to the second device 120, the first measurement report only comprising a first set of measurement results associated with the first set of reference signals.

In some embodiments, the method 500 further comprises: receiving, from the second device 120, an indication that positioning measurements of a second set of reference signals are to be performed in a second frequency range, the second frequency range being different from the first frequency range; performing the positioning measurements of the second set of reference signals; and transmitting a second measurement report to the second device 120, the second measurement report only comprising a second set of measurement results associated with the second set of reference signals.

In some embodiments, the method 500 further comprises: receiving, from the second device 120, first configuration information about the first set of reference signals.

In some embodiments, receiving the indication comprises receiving one of the following: second configuration information about the second set of reference signals, or a signaling for triggering the positioning measurements of the second set of reference signals.

In some embodiments, the method 500 further comprises: transmitting, to the second device 120, an indication that the first measurement report only comprises the first set of measurement results associated with the first set of reference signals.

FIG. 6 shows a flowchart of an example method 600 implemented at a second device in accordance with some example embodiments of the present disclosure. For the purpose of discussion, the method 600 will be described from the perspective of the second device 120 with reference to FIG. 1.

At block 610, the second device 120 receives a measurement report from a first device 110, the measurement report at least comprising a first set of measurement results associated with a first set of reference signals in a first frequency range.

In some embodiments, the method 600 further comprises: transmitting, to the first device 110, assistance information associated with positioning of the first device 110.

In some embodiments, the assistance information indicates at least one of the following: timing for the transmission of the measurement report, a first threshold for the number of available neighbor cells in a first set of neighbor cells transmitting the first set of reference signals, a second threshold for RSRPs of the first set of reference signals, a third threshold for SNRs of time of arrival of the first set of reference signals, a fourth threshold for RSRPs of QCL RS from the first set of neighbor cells, determination of an LoS status, or a fifth threshold for the number of non-LoS links of the first device 110, a sixth threshold for RSRPs of reference signals from the non-LoS links of the first device 110.

In some embodiments, the method 600 further comprises: determining the assistance information based on quality of service requirements for positioning the first device 110.

In some embodiments, receiving the measurement report comprises: receiving the measurement report, the measurement report comprising the first set of measurement results associated with the first set of reference signals and a second set of measurement results associated with the second set of reference signals.

FIG. 7 shows a flowchart of an example method 700 implemented at a second device in accordance with some example embodiments of the present disclosure. For the purpose of discussion, the method 700 will be described from the perspective of the second device 120 with reference to FIG. 1.

At block 710, the second device 120 receives a first measurement report from a first device 110, the first measurement report only comprising a first set of measurement results associated with a first set of reference signals in a first frequency range.

At block 720, the second device 120 determines whether quality of service requirements for positioning the first device 110 are satisfied based on the first measurement report.

At block 730, if the second device 120 determines that the quality of service requirements are satisfied, the second device 120 determines a position of the first device 110 based on the first measurement report.

In some embodiments, the method 700 further comprises: in accordance with a determination that the quality of service requirements fail to be satisfied, transmit, to the first device 110, an indication that positioning measurements of a second set of reference signals are to be performed, the second set of reference signals being transmitted in a second frequency range that is different from the first frequency range; and receiving a second measurement report from the first device 110, the second measurement report only comprising a second set of measurement results associated with the second set of reference signals.

In some embodiments, the method 700 further comprises: transmitting, to the first device 110, first configuration information about the first set of reference signals.

In some embodiments, the method 700 further comprises: obtaining information about the first frequency range from a third device 130 serving the first device 110; and determining the first configuration information about the first set of reference signals based on the first frequency range.

In some embodiments, transmitting the indication comprises transmitting one of the following: second configuration information about the second set of reference signals, or a signaling for triggering the positioning measurements of the second set of reference signals.

In some embodiments, the method 700 further comprises: receiving, from the first device 110, an indication that the first measurement report only comprises the first set of measurement results associated with the first set of reference signals.

In some example embodiments, a first apparatus capable of performing any of the method 400 (for example, the first apparatus) may comprise means for performing the respective steps of the method 400. The means may be implemented in any suitable form. For example, the means may be implemented in a circuitry or software module.

In some example embodiments, the first apparatus comprises: means for performing positioning measurements of a first set of reference signals in a first frequency range; and means for transmitting a first measurement report to a second device, the first measurement report only comprising a first set of measurement results associated with the first set of reference signals in accordance with a determination that quality of service requirements for positioning the first device are satisfied.

In some example embodiments, the first apparatus further comprises: means for receiving, from the second device, assistance information associated with the positioning and means for determining whether the quality of service requirements is satisfied based on the assistance information.

In some embodiments the assistance information indicates at least one of the following: timing for the transmission of the first measurement report, a first threshold for the number of available neighbor cells in a first set of neighbor cells transmitting the first set of reference signals, a second threshold for RSRPs of the first set of reference signals, a third threshold for SNRs of time of arrival of the first set of reference signals, a fourth threshold for RSRPs of QCL RS from the first set of neighbor cells, or determination of an LoS status, a fifth threshold for the number of non-LoS links of the first apparatus, or a sixth threshold for RSRPs of reference signals from the non-LoS links of the first apparatus.

In some embodiments the first apparatus determines that the quality of service requirements are satisfied by determining at least one of the following: the number of the available neighbor cells is greater than the first threshold and RSRPs of reference signals from the available neighbor cells are greater than the second threshold, the number of the available neighbor cells is greater than the first threshold and SNRs of time of arrival of reference signals from the available neighbor cells are greater than the third threshold, the number of the available neighbor cells is greater than the first threshold and RSRPs of the QCL RS from the available neighbor cells are greater than the fourth threshold, the LoS status in each of the available neighbor cell and the number of the available neighbor cells is greater than the first threshold, or the number of the non-LoS links of the first device is greater than the fifth threshold and RSRPs of reference signals from the non-LoS links are greater than the sixth threshold in each of the available neighbor cell, and the number of the available neighbor cells is greater than the first threshold.

In some embodiments, the first apparatus further comprising: in accordance with a determination that the quality of service requirements fail to be satisfied, means for performing positioning measurements of a second set of reference signals in a second frequency range, the second frequency range being different from the first frequency range; and means for transmitting a second measurement report to the second device, the second measurement report comprising the first set of measurement results associated with the first set of reference signals and a second set of measurement results associated with the second set of reference signals.

In some example embodiments, a second apparatus capable of performing any of the method 500 (for example, the first apparatus) may comprise means for performing the respective steps of the method 500. The means may be implemented in any suitable form. For example, the means may be implemented in a circuitry or software module.

In some example embodiments, the first apparatus comprises: means for performing positioning measurements of a first set of reference signals in a first frequency range; and means for transmitting a first measurement report from the first device to a second device, the first measurement report only comprising a first set of measurement results associated with the first set of reference signals.

In some embodiments, the first apparatus further comprises: means for receiving, from the second apparatus, an indication that positioning measurements of a second set of reference signals are to be performed in a second frequency range, the second frequency range being different from the first frequency range; means for performing the positioning measurements of the second set of reference signals; and means for transmitting a second measurement report to the second apparatus, the second measurement report only comprising a second set of measurement results associated with the second set of reference signals.

In some embodiments, the first apparatus further comprises: means for receiving, from the second apparatus, first configuration information about the first set of reference signals.

In some embodiments, means for receiving the indication comprises means for receiving one of the following: second configuration information about the second set of reference signals, or a signaling for triggering the positioning measurements of the second set of reference signals.

In some embodiments, the first apparatus further comprises: means for transmitting, to the second apparatus, an indication that the first measurement report only comprises the first set of measurement results associated with the first set of reference signals.

In some example embodiments, a second apparatus capable of performing any of the method 600 (for example, the second device 120) may comprise means for performing the respective steps of the method 600. The means may be implemented in any suitable form. For example, the means may be implemented in a circuitry or software module.

In some example embodiments, the second apparatus comprises: means for receiving a measurement report from a first device, the measurement report at least comprising a first set of measurement results associated with a first set of reference signals in a first frequency range.

In some embodiments, the second apparatus further comprises: means for transmitting, to the first apparatus, assistance information associated with positioning of the first apparatus.

In some embodiments, the assistance information indicates at least one of the following: timing for the transmission of the measurement report, a first threshold for the number of available neighbor cells in a first set of neighbor cells transmitting the first set of reference signals, a second threshold for RSRPs of the first set of reference signals, a third threshold for SNRs of time of arrival of the first set of reference signals, a fourth threshold for RSRPs of QCL RS from the first set of neighbor cells, determination of an LoS status in each of the available neighbor cell and the number of the available neighbor cells is greater than the first threshold, or a fifth threshold for the number of non-LoS links of the first apparatus, or a sixth threshold for RSRPs of reference signals from the non-LoS links of the first apparatus in each of the available neighbor cell, and the number of the available neighbor cells is greater than the first threshold.

In some embodiments, the second apparatus further comprises: means for determining the assistance information based on quality of service requirements for positioning the first apparatus.

In some embodiments, means for receiving the measurement report comprises: means for receiving the measurement report, the measurement report comprising the first set of measurement results associated with the first set of reference signals and a second set of measurement results associated with the second set of reference signals.

In some example embodiments, a second apparatus capable of performing any of the method 700 (for example, the second device 120) may comprise means for performing the respective steps of the method 700. The means may be implemented in any suitable form. For example, the means may be implemented in a circuitry or software module.

In some example embodiments, the second apparatus comprises: means for receiving a first measurement report from a first device, the first measurement report only comprising a first set of measurement results associated with a first set of reference signals in a first frequency range; means for determining whether quality of service requirements for positioning the first device are satisfied based on the first measurement report; and means for determining a position of the first device based on the first measurement report in accordance with a determination that the quality of service requirements are satisfied.

In some embodiments, the second apparatus further comprises: in accordance with a determination that the quality of service requirements fail to be satisfied, means for transmitting, to the first apparatus, an indication that positioning measurements of a second set of reference signals are to be performed, the second set of reference signals being transmitted in a second frequency range that is different from the first frequency range; and means for receiving a second measurement report from the first apparatus, the second measurement report only comprising a second set of measurement results associated with the second set of reference signals.

In some embodiments, the second apparatus further comprises: means for transmitting, to the first apparatus, first configuration information about the first set of reference signals.

In some embodiments, the second apparatus further comprises: means for obtaining information about the first frequency range from a third device serving the first apparatus; and means for determining the first configuration information about the first set of reference signals based on the first frequency range.

In some embodiments, means for transmitting the indication comprises means for transmitting one of the following: second configuration information about the second set of reference signals, or a signaling for triggering the positioning measurements of the second set of reference signals.

In some embodiments, the second apparatus further comprises: means for receiving, from the first apparatus, an indication that the first measurement report only comprises the first set of measurement results associated with the first set of reference signals.

Figures 8, 9:
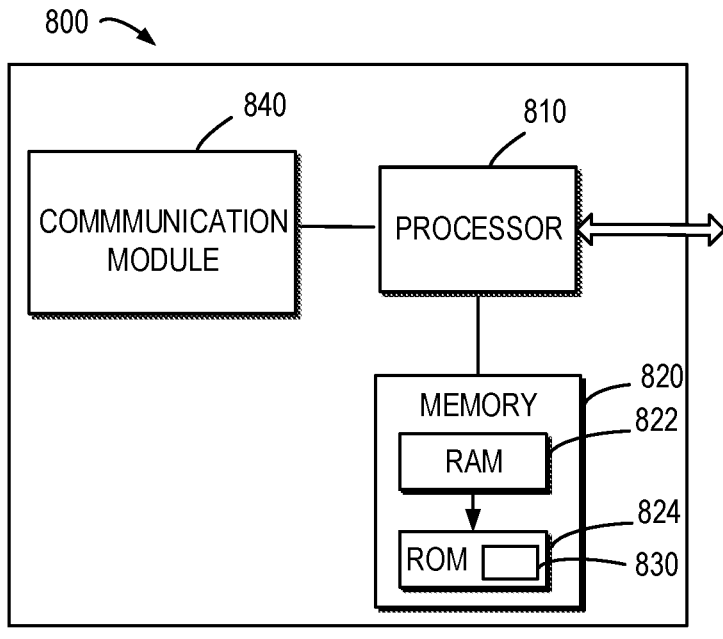
FIG. 8 illustrates a simplified block diagram of an apparatus that is suitable for implementing embodiments of the present disclosure.
FIG. 9 illustrates a block diagram of an example computer readable medium in accordance with some example embodiments of the present disclosure.

FIG. 8 is a simplified block diagram of a device 800 that is suitable for implementing embodiments of the present disclosure. The device 800 may be provided to implement the communication device, for example, the first device 110 or the second device 120 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 2 to 7. The embodiments of the present disclosure may also be implemented by hardware or by a combination of software and hardware.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400, 500, 600 and 700 as described above with reference to FIGS. 4-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
at least one processor; and
at least one memory including computer program code;
the at least one memory and the computer program code configured to, with the at least one processor, cause the first device to:
perform positioning measurements of a first set of reference signals in a first frequency range; and
in accordance with a determination that quality of service requirements for positioning the first device are satisfied based on performing the positioning measurements of the first set of reference signals, transmit a first measurement report to a second device, the first measurement report only comprising a first set of measurement results associated with the first set of reference signals.

2. The first device of claim 1, wherein the at least one memory and the computer program code configured to, with the at least one processor, further cause the first device to:

receive, from the second device, assistance information associated with the positioning; and determine whether the quality of service requirements are satisfied based on the assistance information.

3. The first device of claim 2, wherein the assistance information indicates at least one of the following:

timing for the transmission of the first measurement report, a first threshold for a number of available neighbor cells in a first set of neighbor cells transmitting the first set of reference signals, a second threshold for reference signal received powers, RSRPs, of the first set of reference signals, a third threshold for signal to noise ratios, SNRs, of time of arrival of the first set of reference signals, a fourth threshold for RSRPs of Quasi-Colocation reference signals, QCL RS, from the first set of neighbor cells, determination of a line of sight, LoS, status, a fifth threshold for a number of non-LOS links of the first device, or a sixth threshold for RSRPs for reference signals from the non-LoS links.

4. The first device of claim 3, wherein the first device is caused to determine that the quality of service requirements are satisfied by determining at least one of the following:

the number of the available neighbor cells is greater than the first threshold and RSRPs of reference signals from the available neighbor cells are greater than the second threshold, the number of the available neighbor cells is greater than the first threshold and SNRs of time of arrival of reference signals from the available neighbor cells are greater than the third threshold, the number of the available neighbor cells is greater than the first threshold and RSRPs of the QCL RS from the available neighbor cells are greater than the fourth threshold, the LoS status in each of the available neighbor cell and the number of the available neighbor cells is greater than the first threshold, or the number of the non-LOS links of the first device is greater than the fifth threshold, RSRPs of reference signals from the non-LOS links are greater than the sixth threshold in each of the available neighbor cell, and the number of the available neighbour cells is greater than the first threshold.

5. The first device of claim 1, wherein the at least one memory and the computer program code configured to, with the at least one processor, further cause the first device to:

in accordance with a determination that the quality of service requirements fails to be satisfied, perform positioning measurements of a second set of reference signals in a second frequency range, the second frequency range being different from the first frequency range; and transmit a second measurement report to the second device, the second measurement report comprising the first set of measurement results associated with the first set of reference signals and a second set of measurement results associated with the second set of reference signals.

6. A first device, comprising:

at least one processor; and at least one memory including computer program code;

the at least one memory and the computer program code configured to, with the at least one processor, cause the first device to:

perform positioning measurements of a first set of reference signals in a first frequency range; and transmit a first measurement report to a second device, the first measurement report only comprising a first set of measurement results associated with the first set of reference signals;

receive, from the second device, an indication that positioning measurements of a second set of reference signals are to be performed in a second frequency range, the second frequency range being different from the first frequency range;

perform the positioning measurements of the second set of reference signals; and transmit a second measurement report to the second device, the second measurement report only comprising a second set of measurement results associated with the second set of reference signals.

7. The first device of claim 6, wherein the at least one memory and the computer program code configured to, with the at least one processor, further cause the first device to:

receive, from the second device, first configuration information about the first set of reference signals.

8. The first device of claim 6, wherein the first device is caused to receive the indication by receiving one of the following:

second configuration information about the second set of reference signals, or a signaling for triggering the positioning measurements of the second set of reference signals.

9. The first device of claim 6, wherein the at least one memory and the computer program code configured to, with the at least one processor, further cause the first device to:

transmit, to the second device, an indication that the first measurement report only comprises the first set of measurement results associated with the first set of reference signals.

10. A second device, comprising:

at least one processor; and at least one memory including computer program code;

the at least one memory and the computer program code configured to, with the at least one processor, cause the second device to:

receive a first measurement report from a first device, the first measurement report only comprising a first set of measurement results associated with a first set of reference signals in a first frequency range;

determine whether quality of service requirements for positioning the first device are satisfied based on the first measurement report; and in accordance with a determination that the quality of service requirements are satisfied, determine a position of the first device based on the first measurement report.

11. The second device of claim 10, wherein the at least one memory and the computer program code configured to, with the at least one processor, further cause the second device to:

in accordance with a determination that the quality of service requirements fail to be satisfied, transmit, to the first device, an indication that positioning measurements of a second set of reference signals are to be performed, the second set of reference signals being transmitted in a second frequency range that is different from the first frequency range; and receive a second measurement report from the first device, the second measurement report only comprising a second set of measurement results associated with the second set of reference signals.

12. The second device of claim 10, wherein the at least one memory and the computer program code configured to, with the at least one processor, further cause the second device to:

transmit, to the first device, first configuration information about the first set of reference signals.

13. The second device of claim 12, wherein the at least one memory and the computer program code configured to, with the at least one processor, further cause the second device to:

obtain information about the first frequency range from a third device serving the first device; and determine the first configuration information about the first set of reference signals based on the first frequency range.

14. The second device of claim 11, wherein the second device is caused to transmit the indication by transmitting one of the following:

second configuration information about the second set of reference signals, or a signaling for triggering the positioning measurements of the second set of reference signals.

15. The second device of claim 10, wherein the at least one memory and the computer program code configured to, with the at least one processor, further cause the second device to:

receive, from the first device, an indication that the first measurement report only comprises the first set of measurement results associated with the first set of reference signals.

\* \* \* \* \*